(12) United States Patent
Ii

(10) Patent No.: US 7,668,814 B2
(45) Date of Patent: Feb. 23, 2010

(54) DOCUMENT MANAGEMENT SYSTEM

(75) Inventor: Yasuhiro Ii, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 398 days.

(21) Appl. No.: 11/510,016

(22) Filed: Aug. 24, 2006

(65) Prior Publication Data

US 2008/0222095 A1  Sep. 11, 2008

(30) Foreign Application Priority Data

Aug. 24, 2005  (JP) .............................. 2005-243449

(51) Int. Cl.
*G06F 17/30* (2006.01)
(52) U.S. Cl. .................. 707/3; 707/4; 707/5; 707/6; 707/104.1
(58) Field of Classification Search ................ 707/1–7, 707/104.1; 382/164
See application file for complete search history.

(56) References Cited

U.S. PATENT DOCUMENTS

| | | | | |
|---|---|---|---|---|
| 5,696,962 | A * | 12/1997 | Kupiec | 707/4 |
| 6,573,907 | B1 * | 6/2003 | Madrane | 715/719 |
| 7,403,657 | B2 * | 7/2008 | Nagasaka et al. | 382/209 |
| 2004/0220898 | A1 * | 11/2004 | Eguchi et al. | 707/1 |
| 2005/0097080 | A1 * | 5/2005 | KethiReddy et al. | 707/3 |
| 2005/0177555 | A1 * | 8/2005 | Alpert et al. | 707/3 |
| 2005/0198076 | A1 * | 9/2005 | Stata et al. | 707/200 |
| 2006/0062453 | A1 * | 3/2006 | Schacht | 382/164 |
| 2006/0200464 | A1 * | 9/2006 | Gideoni et al. | 707/6 |
| 2006/0277167 | A1 * | 12/2006 | Gross et al. | 707/3 |

FOREIGN PATENT DOCUMENTS

| | | |
|---|---|---|
| JP | 2004-199696 | 7/2004 |
| JP | 2005-135041 | 5/2005 |

* cited by examiner

*Primary Examiner*—Don Wong
*Assistant Examiner*—Hanh B Thai
(74) *Attorney, Agent, or Firm*—Blakely, Sokoloff, Taylor & Zafman LLP

(57) ABSTRACT

A document management system includes an image input unit that inputs a document as an electronic image; a character extraction unit that extracts character information from the input electronic image; a word extraction unit that extracts words from the character information; a document search unit that normalizes the extracted words, registers the normalized words in an index, and searches electronic images using the index; an attribute information generation unit that generates attribute information including the extracted words, positions and sizes of the extracted words, and the normalized words referring to the positions and sizes of corresponding extracted words; a search condition input unit that inputs a search keyword that is used by the document search unit when searching for a target electronic image; and a word highlighting unit that highlights the search keyword in the target electronic image found by the document search unit based on the attribute information.

3 Claims, 6 Drawing Sheets ns of word forms generated by word form denormalization becomes. A huge increase in the number of word forms generated by word form normalization results in an increase in processing time. Therefore, in practice, the word form denormalization process stops when the number of word forms exceeds a certain limit. In this case, the generated word forms may not always include all original forms of the normalized word. In other words, words in a retrieved document which words correspond to an indexed word but are not included in the generated word forms are not highlighted.

DOCUMENT MANAGEMENT SYSTEM

PRIORITY

The present application claims priority to and incorporates by reference the entire contents of Japanese Priority Application No. 2005-243449, filed in Japan on Aug. 24, 2005.

BACKGROUND OF THE INVENTION

1. Field of the Invention

The present invention generally relates to a document management system, and more particularly relates to a document management system which inputs documents as electronic images, and stores, displays, and searches the electronic images.

2. Description of the Related Art

In the descriptions below, Japanese double-byte characters (Hiragana, Katakana, and Kanji) are expressed in Latin alphabet letters.

An electronic filing system, which digitizes paper documents and stores the digitized documents, normally includes a function for searching the stored documents and a function for indicating relevant parts of retrieved documents to the user. For example, when a user searches for documents containing a search term "patent publication" and opens a retrieved document, occurrences of the search term "patent publication" in the retrieved document are highlighted. Such a function is called search result highlighting. Also, there is a method of searching documents in which various forms of a word are treated as the same word to increase the number of documents a search will find. For example, treating Japanese words "memorii" and "memori" (both mean "memory" in English) as the same word may make it easier to find relevant documents. Also, treating various forms of a word written in upper case, lower case, single-byte characters, or double-byte characters, such as "Memory", "MEMORY", and "MEMORY (in double-byte characters)", as the same word may make it easier to find relevant documents. Such a method of standardizing various forms of a word is called word form normalization. On the other hand, generating various forms of a word from one form of the word is called word form denormalization. In word form denormalization, for example, "MEMORY", "memory", and "MEMORY (in double-byte characters)" are generated from the word "Memory".

An exemplary process of search result highlighting is described below. When the operator enters a search keyword (s), a search subsystem searches documents and returns a list of documents found. The operator selects a document in the list and displays the document. In the above process, the search subsystem performs word form denormalization on the search keyword and highlights all occurrences of various forms of the search keyword in the displayed document. One of the disadvantages of this method is that the word form denormalization may not always generate all forms of a search keyword. Take a method of word form normalization where all Katakana-Hiragana prolonged sound marks ("—" which mark indicates a prolonged sound in a Japanese word) are removed from indexed words. In such a method, for example, a Japanese word "konpyuutaa" ("computer" in English) is normalized into "konpyuta" and added to the search index. Also, "konpyuuta" is normalized into "konpyuta". As a result, "konpyuutaa" and "konpyuuta" are treated as the same word in the search index. Such a search index enables finding documents containing different forms of a search keyword. However, there is a problem when the indexed word "konpyuta" is denormalized into original forms. For example, "konpyuta" may be denormalized into many forms such as "konpyuuta", "konpyuutaa", "koonpyuuta", "koonnpyuuta", and "konnpyuuta", as a result of inserting the Katakana-Hiragana prolonged sound mark "—" after each Katakana character. In such a method, the longer a word is the greater the number of word forms generated by word form denormalization becomes. A huge increase in the number of word forms generated by word form normalization results in an increase in processing time. Therefore, in practice, the word form denormalization process stops when the number of word forms exceeds a certain limit. In this case, the generated word forms may not always include all original forms of the normalized word. In other words, words in a retrieved document which words correspond to an indexed word but are not included in the generated word forms are not highlighted.

Japanese Patent Application Publication No. 2005-135041 discloses a highly functional document image search/browse system having an OCR apparatus and a separate document processing apparatus. The OCR apparatus generates OCR data which includes reading hypothesis data containing multiple hypotheses of character line extraction, character segmentation, and character recognition; and document structure data having ruled line information, frame information, character line information, browse attribute information, and the like of a document image. The document processing apparatus provides a function for extracting important keywords from typed and handwritten character strings using the OCR data, a function for searching documents, and a function for displaying documents in a manner a user requests using the document structure data.

However, the purpose of the system disclosed in Japanese Patent Application Publication No. 2005-135041 is mainly to improve OCR accuracy, and the system requires a complex configuration and much time for OCR processing.

SUMMARY OF THE INVENTION

A document management system is described. In one embodiment, a document management system, comprises an image input unit that inputs a document as an electronic image, a character extraction unit that extracts character information from the input electronic image, a word extraction unit that extracts words from the character information, a document search unit that normalizes the extracted words, registers the normalized words in an index, and searches electronic images using the index, an attribute information generation unit that generates attribute information of the input electronic image which attribute information includes the extracted words, positions and sizes of the extracted words in the input electronic image, and the normalized words referring to the positions and sizes of corresponding extracted words, a search condition input unit that inputs a search keyword with which the document search unit searches for a target electronic image, and a word highlighting unit that highlights the search keyword in the target electronic image found by the document search unit based on the attribute information.

DESCRIPTION OF THE PREFERRED EMBODIMENTS

Figure 1:
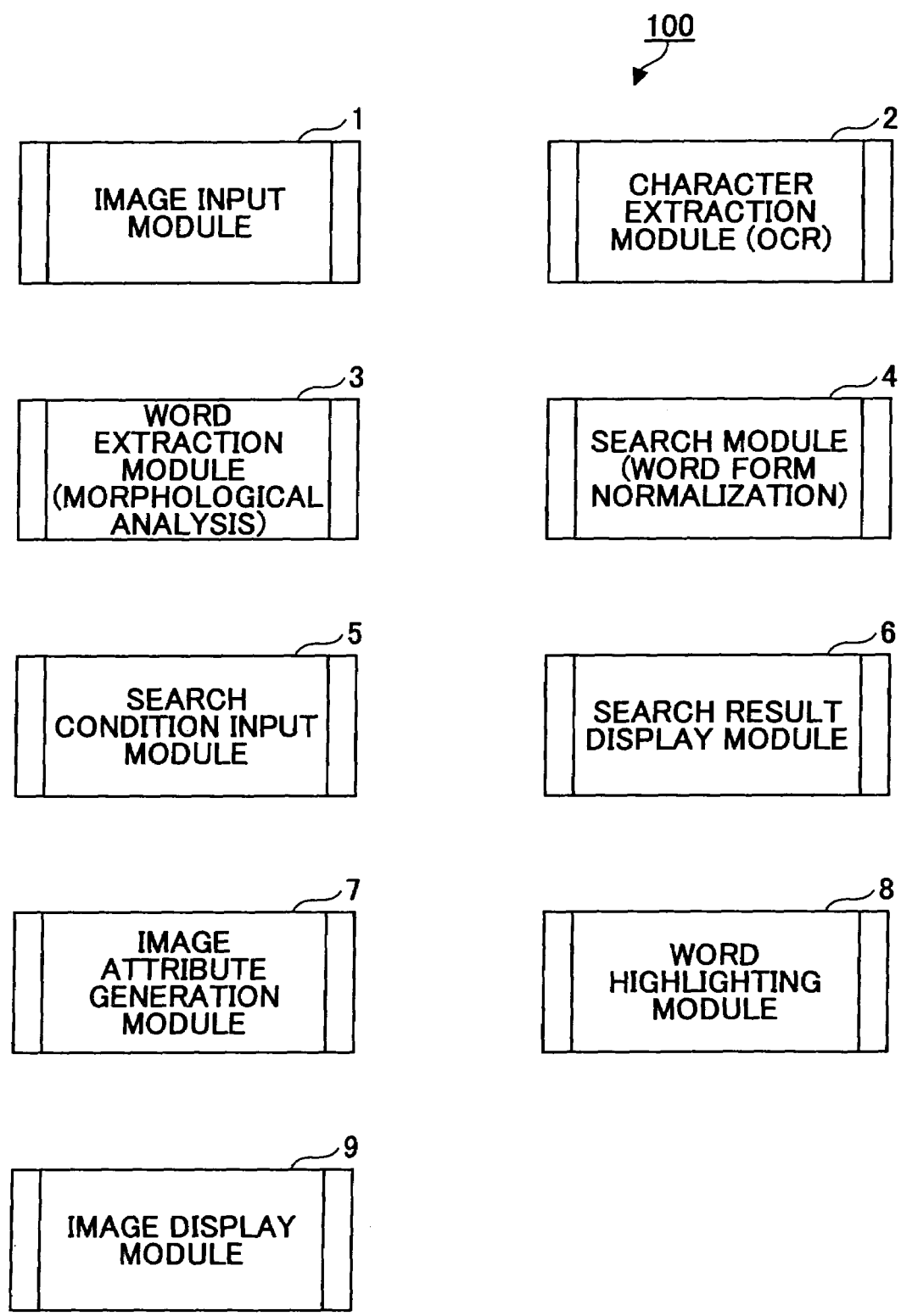
FIG. 1 is a drawing illustrating an exemplary module configuration of a document management system according to an embodiment of the present invention.

Embodiments of the present invention include a document management system that substantially obviates one or more problems caused by the limitations and disadvantages of the related art.

An embodiment of the present invention includes a document management system which maintains attribute information for documents to be searched, where the attribute information includes both words extracted from the documents and words obtained by normalizing the extracted words, and thereby enables highlighting all forms of a search keyword in retrieved documents.

A document management system according to an embodiment of the present invention includes an image input unit which inputs a document as an electronic image; a character extraction unit which extracts character information from the input electronic image; a word extraction unit which extracts words from the character information; a document search unit which normalizes the extracted words, registers the normalized words in an index, and searches electronic images using the index; an attribute information generation unit which generates attribute information of the input electronic image which attribute information includes the extracted words, positions and sizes of the extracted words in the input electronic image, and the normalized words referring to the positions and sizes of corresponding extracted words; a search condition input unit which inputs a search keyword with which the document search unit searches for a target electronic image; and a word highlighting unit which highlights the search keyword in the target electronic image found by the document search unit based on the attribute information.

According to one embodiment of the present invention, the word highlighting unit highlights, in the target electronic image, both the search keyword input by the search condition input unit and a normalized word corresponding to the search keyword.

According to one embodiment of the present invention, the word highlighting unit determines whether an entry in the attribute information is a normalized word or a non-normalized word, and highlights a normalized word and a non-normalized word in different According to one embodiment of the present invention, the word extraction unit extract words by morphological analysis, where text written in a natural language is segmented into minimal meaningful units and parts of speech of the minimal meaningful units are determined, thereby enabling accurate extraction of words.

According to one embodiment of the present invention, the document search unit normalizes the search keyword input by the search condition input unit and searches electronic images using the normalized search keyword. Such a normalized search keyword, in turn, makes it possible to appropriately generate various forms of the search keyword.

As described above, in a document management system according to an embodiment of the present invention, both words extracted from an image and normalized forms of the extracted words are registered in the attribute information of the image, and, when the image is displayed, both the extracted words and the normalized forms of the words can be highlighted. Such a system solves a problem where some words in an image are not highlighted because of a limitation in word form denormalization.

Also, in a document management system according to an embodiment of the present invention, an exact search keyword input by the operator and other forms of the search keyword can be highlighted in different manners, for example, by using markers of different colors. Such a system may provide an interface which is easy for users to understand.

In addition, the word extraction unit extracts words by morphological analysis, where text written in a natural language is segmented into minimal meaningful units and parts of speech of the minimal meaningful units are determined, thereby enabling accurate extraction of words.

According to another embodiment of the present invention, the document search unit searches documents using a keyword normalized by word form normalization, which standardizes various forms of a word. Such a normalized keyword, in turn, makes it possible to appropriately generate various forms of the keyword.

Preferred embodiments of the present invention are described below with reference to the accompanying drawings. Component parts and the types, combinations, shapes, relative positions, and the like of the component parts in the embodiments are examples used for descriptive purpose. The present invention is not limited to the specifically disclosed embodiments unless otherwise stated.

In the descriptions below, Japanese double-byte characters (Hiragana, Katakana, and Kanji) are expressed in Latin alphabet letters.

FIG. 1 is a drawing illustrating an exemplary module configuration of a document management system according to an embodiment of the present invention. A document management system 100 includes an image input module (image input unit) 1 for inputting a document as an electronic image; a character extraction module (character extraction unit) 2 for extracting character information from the electronic image input by the image input module 1; a word extraction module (word extraction unit) 3 for extracting words from the character information extracted by the character extraction module 2; a search module (document search unit) 4 for normalizing the words extracted by the word extraction module 3, registering the normalized words in an index, and searching documents using the index; a search condition input module (search condition input unit) 5 for inputting a search keyword; a search result display module (search result display unit) 6 for extracting character strings from retrieved documents which character strings contain the input search keyword or a normalized form of the input search keyword and for displaying the extracted character strings together with search results; an image attribute generation module (attribute information generation unit) 7 for generating attribute information of the electronic image by using the character information, the extracted words, and the normalized words which attribute information includes the extracted words and positions and sizes of the extracted words in the input electronic image, and the normalized words referring to the positions and sizes of corresponding extracted words; a word highlighting module (word highlighting unit) 8 for highlighting words in a retrieved electronic image; and an image display module 9 for selecting a document from retrieved documents and for displaying the selected document.

The words to be highlighted may include not only the exact search keyword but also a corresponding normalized word indexed when the image is registered. For example, when a Japanese word "memorii" is normalized and indexed as "memori" in a search system, "memori" in a document retrieved by a search keyword "memorii" is also highlighted.

Figure 2:
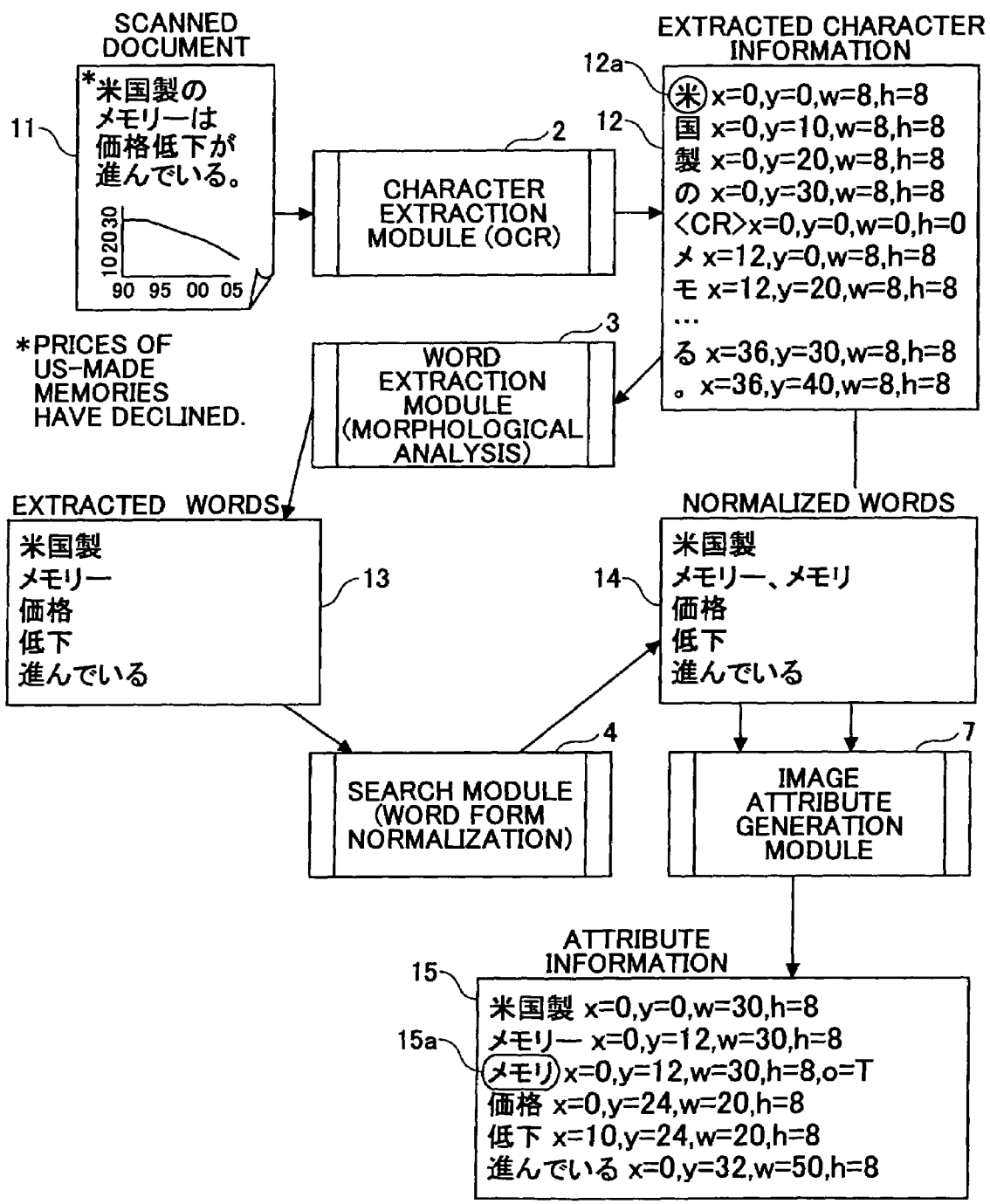
FIG. 2 is a drawing illustrating an exemplary process of registering a scanned image.

FIG. 2 is a drawing illustrating an exemplary process of registering a scanned image. In FIG. 2, the same reference numbers are used for modules corresponding to those shown in FIG. 1, and descriptions of those modules are omitted. In this embodiment, both words extracted from an image and normalized forms of the extracted words are registered in the attribute information of the image, and, when the image is displayed, both the extracted words and the normalized forms of the words can be highlighted. The character extraction module 2 performs OCR processing on a scanned document 11. In the OCR processing, character information 12 of the document 11 is extracted. The character information 12 includes characters in the document 11 and the positions and sizes of the characters. For example, the first line of the character information 12 indicates that a Japanese character 12a is located at a position (0.0) from the upper-left corner of the document 11 and the width and height of the Japanese character 12a are both eight pixels. The word extraction module 3 extracts words by segmenting text extracted by the OCR processing and outputs the results. Words 13 extracted by the word extracting module 3 are passed to the search module 4. The search module 4 performs word form normalization to standardize various forms of words and creates a search index 14 from the standardized (normalized) words. The search module 4 also reports the normalized words as normalization information. The image attribute generation module 7 generates attribute information 15 of the document 11 by using the character information, the extracted words, and the normalized words. The attribute information includes the extracted words and positions and sizes of the extracted words in the document 11 and the normalized words referring to the positions and sizes of corresponding extracted words. In the attribute information 15, the normalized words are indicated by a flag. For example, in the third line of the attribute information 15, a normalized word 15a is indicated by a flag o=T.

Figure 3:
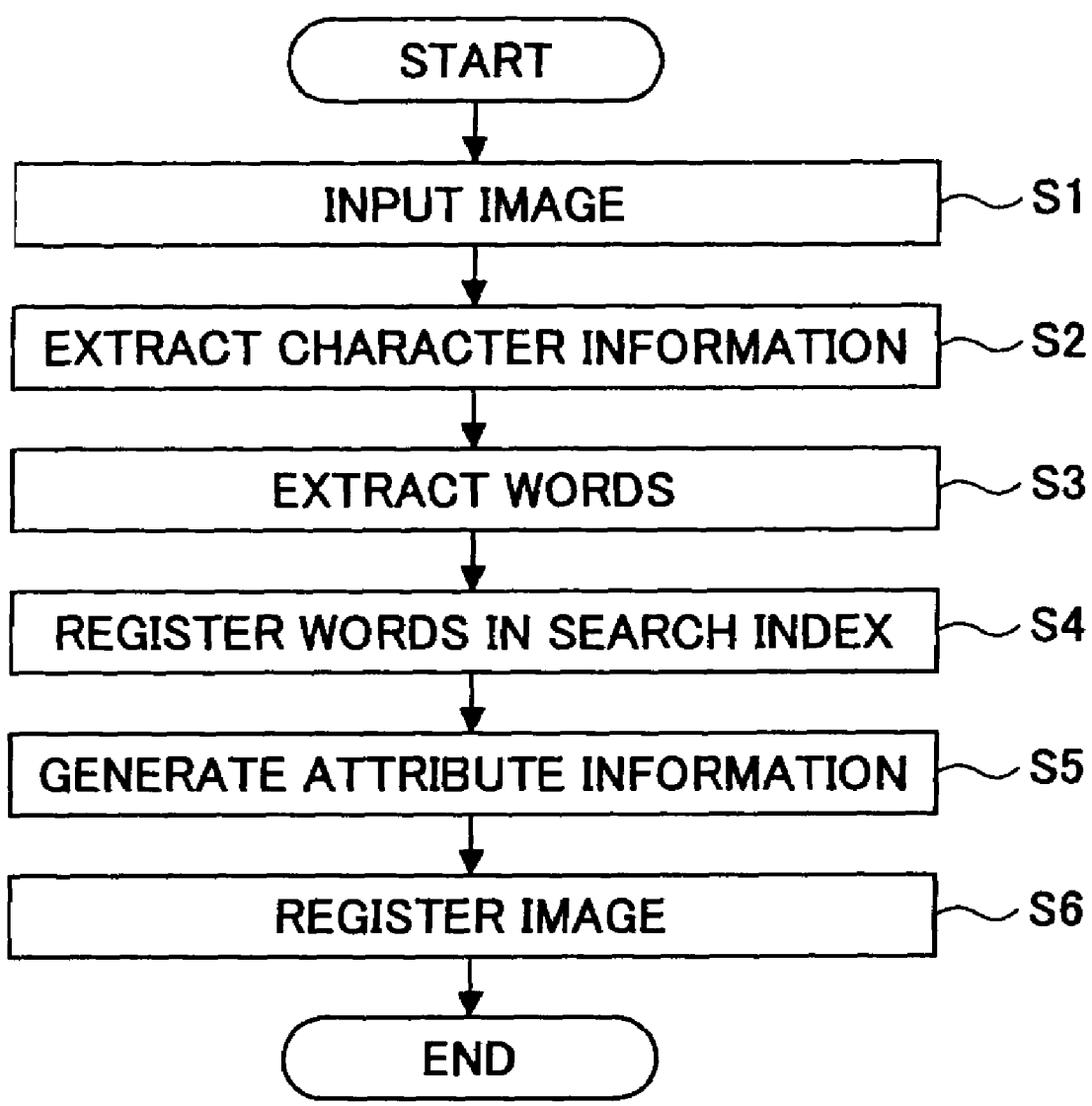
FIG. 3 is a flowchart illustrating an exemplary process of registering a scanned image.

FIG. 3 is a flowchart illustrating an exemplary process of registering a scanned image. The document 11 is scanned and input into a document management system (S1). The character extraction module 2 performs OCR processing on the scanned document 11 (S2). In the OCR processing, character information 12 in the document 11 is extracted. The character information 12 includes characters in the document 11 and the positions and sizes of the characters. For example, the first line of the character information 12 indicates that the Japanese character 12a is located at a position (0.0) from the upper-left corner of the document 11 and the width and height of the Japanese character 12a are both eight pixels. The word extraction module 3 extracts words by segmenting text extracted by the OCR processing and outputs the results (S3). Words 13 extracted by the word extracting module 3 are passed to the search module 4. The search module 4 performs word form normalization to standardize various forms of words and registers the standardized (normalized) words in a search index 14 (S4). The search module 4 also reports the normalized words as normalization information. The image attribute generation module 7 generates attribute information 15 of the document 11 by using the character information, the extracted words, and the normalized words. The attribute information includes the extracted words and positions and sizes of the extracted words in the document 11, and the normalized words referring to the positions and sizes of corresponding extracted words (S5). In the attribute information 15, the normalized words are indicated by a flag. For example, in the third line of the attribute information 15, the normalized word 15a is indicated by a flag o=T. Finally, the document 11 with the attribute information 15 is registered (S6).

Figure 4:
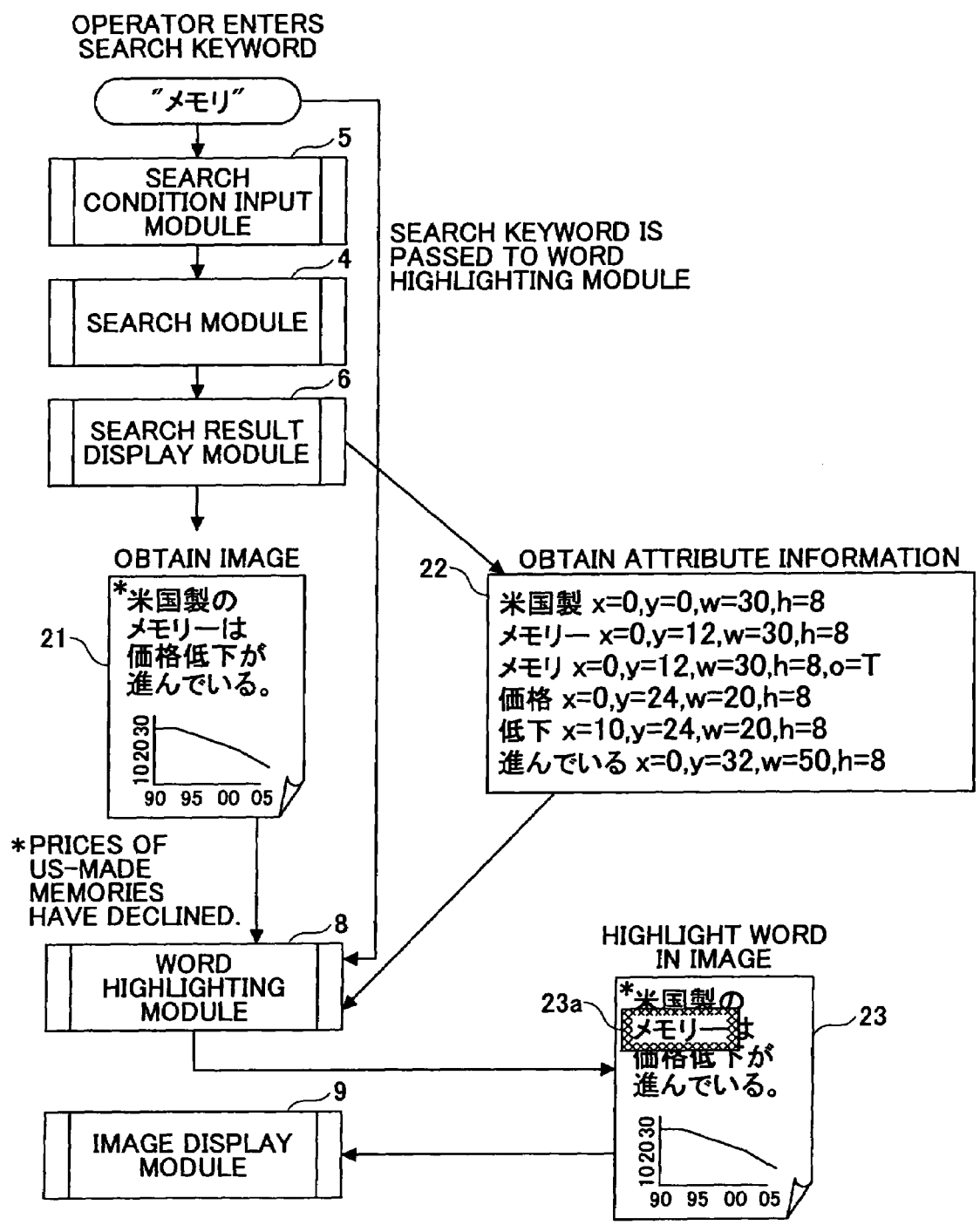
FIG. 4 is a drawing illustrating exemplary steps from entering a search keyword through displaying a document.

FIG. 4 is a drawing illustrating exemplary steps from entering a search keyword through displaying a document. When the operator enters a search keyword "memori" via the search condition input module 5, the search condition input module 5 passes the search keyword to the search module 4, and the search result display module 6 displays a list of retrieved documents on a search result list screen (not shown). When the operator specifies a document from the list, an image 21 of the document, attribute information 22 of the document, and the search keyword are passed to the word highlighting module 8. The word highlighting module 8 scans the attribute information 22 for the search keyword. When the search keyword is found in the attribute information 22, the word highlighting module 8 highlights an area 23a in the image according to the position and size of the search keyword described in the attribute information 22. The image display module 9 then displays the image.

Figure 5:
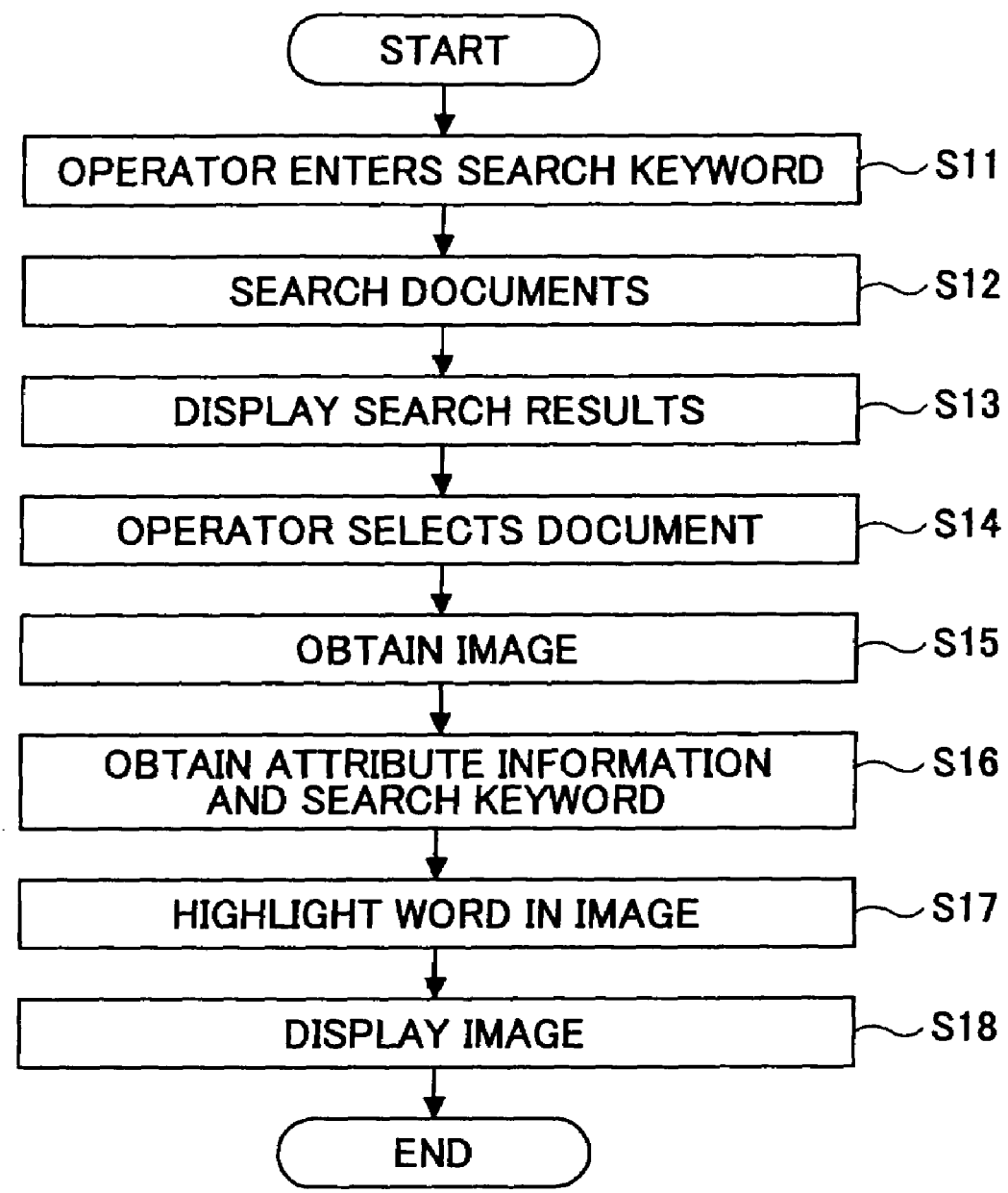
FIG. 5 is a flowchart illustrating exemplary steps from entering a search keyword through displaying a document.

FIG. 5 is a flowchart illustrating exemplary steps from entering a search keyword through displaying a document. When the operator enters a search keyword "memori" via the search condition input module 5 (S11), the search condition input module 5 passes the search keyword to the search module 4 (S12), and the search result display module 6 displays a list of retrieved documents on a search result list screen (not shown) (S13). When the operator selects a document from the list, an image 21 of the document, attribute information 22 of the document, and the search keyword are passed to the word highlighting module 8 (S15, 16). The word highlighting module 8 scans the attribute information 22 for the search keyword. When the search keyword is found in the attribute information 22, the word highlighting module 8 highlights an area 23a in the image according to the position and size of the search keyword described in the attribute information 22 (S17). The image display module 9 then displays the image (S18).

Figure 6:
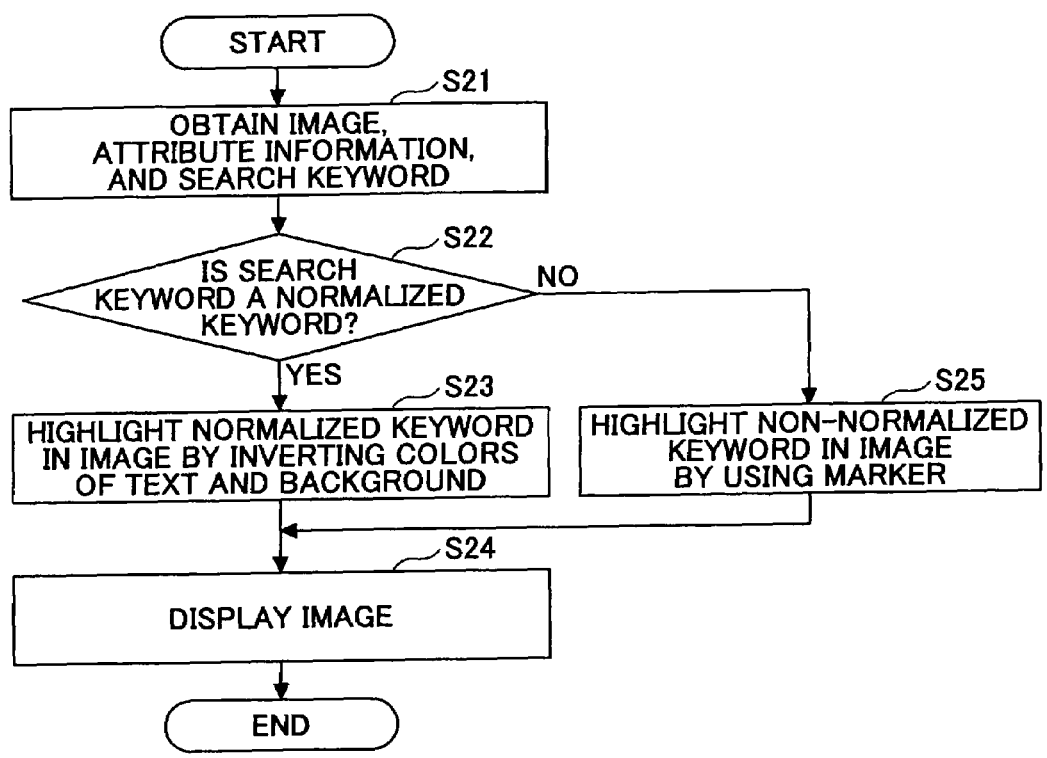
FIG. 6 is a flowchart illustrating exemplary image processing according to an embodiment of the present invention.

FIG. 6 is a flowchart illustrating exemplary image processing according to an embodiment of the present invention. In this embodiment, the word highlighting module 8 determines whether an entry in the attribute information 22 is a normalized word or a non-normalized word, and highlights a normalized word and a non-normalized word in different manners. In FIG. 6, as the first step, the image of a document, attribute information 22 of the document, and a search keyword are passed to the word highlighting module 8 (S21). The word highlighting module 8 determines whether an entry in the attribute information 22 which entry corresponds to the search keyword is a normalized word or a non-normalized word (S22). When the entry is a normalized word, the word highlighting module 8 highlights the normalized word in the image by inverting the colors of the text and background (S23). When the entry is a non-normalized word, the word highlighting module 8 highlights the non-normalized word in the image by using a marker (S25).

As described above, in a document management system according to an embodiment of the present invention, both words extracted from an image and normalized forms of the extracted words are registered in the attribute information of the image, and when the image is displayed, both the extracted words and the normalized forms of the words can be highlighted. Such a system solves a problem where some words in an image are not highlighted because of a limitation in word form denormalization.

Also, in a document management system according to an embodiment of the present invention, an exact search keyword input by the operator and other forms of the search keyword can be highlighted in different manners, for example, by using markers of different colors. Such a system may provide an interface which is easy for users to understand.

In addition, the word extraction module 3 extracts words by morphological analysis, where text written in a natural language is segmented into minimal meaningful units and parts of speech of the minimal meaningful units are determined, thereby enabling accurate extraction of words.

Further, the search module 4 searches documents using a keyword normalized by word form normalization, which standardizes various forms of a word. Such a normalized keyword, in turn, makes it possible to appropriately generate various forms of the keyword.

The present invention is not limited to the specifically disclosed embodiments, and variations and modifications may be made without departing from the scope of the present invention.

What is claimed is:

1. A document management system, comprising:
   an image input unit to input documents as electronic images;
   a memory to store the input electronic images;
   a character extraction unit to extract character information from the input electronic images;
   a word extraction unit to extract words from the character information;
   a search condition input unit to input a search keyword;
   a document search unit to normalize the extracted words and to register the normalized words in an index, the document search unit being also configured to normalize the search keyword input by the search condition input unit and to find a target electronic image by searching the index with the normalized search keyword;
   an attribute information generation unit to generate attribute information of the respective input electronic images, where the attribute information includes the extracted words, positions and sizes of the extracted words in the corresponding input electronic images, and the normalized words referring to the positions and sizes of the corresponding extracted words; and
   a word highlighting unit to highlight a matching normalized word corresponding to the normalized search keyword and/or a matching extracted word corresponding to the matching normalized word in the target electronic image found by the document search unit based on the attribute information of the target electronic image.

2. The document management system as claimed in claim 1, wherein the word highlighting unit highlights the matching normalized word and the matching extracted word in different manners.

3. The document management system as claimed in claim 1, wherein the word extraction unit extracts words by morphological analysis, where text written in a natural language is segmented into minimal meaningful units and parts of speech of the minimal meaningful units are determined.

* * * * *